No. 745,182. PATENTED NOV. 24, 1903.
T. F. HART.
SHOE TYING MACHINE.
APPLICATION FILED JAN. 2, 1903.
NO MODEL. 8 SHEETS—SHEET 1.

No. 745,182. PATENTED NOV. 24, 1903.
T. F. HART.
SHOE TYING MACHINE.
APPLICATION FILED JAN. 2, 1903.
NO MODEL. 8 SHEETS—SHEET 3.

Witnesses:
A. D. Harrison
G. A. Pezzetti

Inventor:
T. F. Hart
by Wright Brown & Quinby
attys.

No. 745,182. PATENTED NOV. 24, 1903.
T. F. HART.
SHOE TYING MACHINE.
APPLICATION FILED JAN. 2, 1903.
NO MODEL. 8 SHEETS—SHEET 4.

No. 745,182. PATENTED NOV. 24, 1903.
T. F. HART.
SHOE TYING MACHINE.
APPLICATION FILED JAN. 2, 1903.
NO MODEL. 8 SHEETS—SHEET 5.

No. 745,182. PATENTED NOV. 24, 1903.
T. F. HART.
SHOE TYING MACHINE.
APPLICATION FILED JAN. 2, 1903.
NO MODEL. 8 SHEETS—SHEET 6.

Fig. 8.

Witnesses:
Inventor:
T. F. Hart.

No. 745,182. Patented November 24, 1903.

UNITED STATES PATENT OFFICE.

THOMAS F. HART, OF LYNN, MASSACHUSETTS.

SHOE-TYING MACHINE.

SPECIFICATION forming part of Letters Patent No. 745,182, dated November 24, 1903.

Application filed January 2, 1903. Serial No. 137,432. (No model.)

*To all whom it may concern:*

Be it known that I, THOMAS F. HART, of Lynn, in the county of Essex and State of Massachusetts, have invented certain new and useful Improvements in Shoe-Tying Machines, of which the following is a specification.

This invention relates to machines for lacing or tying together the edges of the quarters of shoe-uppers, so as to have them in proper condition for lasting.

In the preferred embodiment of my invention hereinafter described I employ a suitable chain-stitch sewing mechanism; but in place of the needle there is used a comparatively-blunt taper-ended bar which passes through the eyelets of the upper and performs the function of feeding the work, as well as acting in conjunction with the looper to make the stitches. For this element I employ the term "needle" as a convenience; but it is to be understood that it has different and additional functions from the ordinary work-piercing needle of a sewing-machine. The needle has a hook and a movable guard to protect the barb of said hook from engaging the work on the upstroke of the needle.

To make the stitches of sufficient looseness to allow the shoe-quarters or flies to be opened out or brought into the same plane after being tied in doubled or parallel position, there is employed an element which may be termed a "stitch-loosener," which operates back and forth across the path of the needle and is interposed under the loop as the latter is carried by the needle up from one eyelet and over and into the next succeeding one.

After a predetermined number of stitches have been formed a work-shifter moves the margin of the upper out of the path of the needle and allows the last stitch to be made outside of said margin, with the result that when the thread is broken off a knot remains on the upper for preventing the lacing or thread from untying.

Of the accompanying drawings, Figs. 13 to 17, inclusive, represent perspective views of the work and upper stitch-forming mechanism at different stages in the formation of a stitch. Figs. 18 to 20, inclusive, represent perspective views showing different stages in the formation of the knot or last stitch.

The same reference characters indicate the same parts in all the figures.

Figure 1:
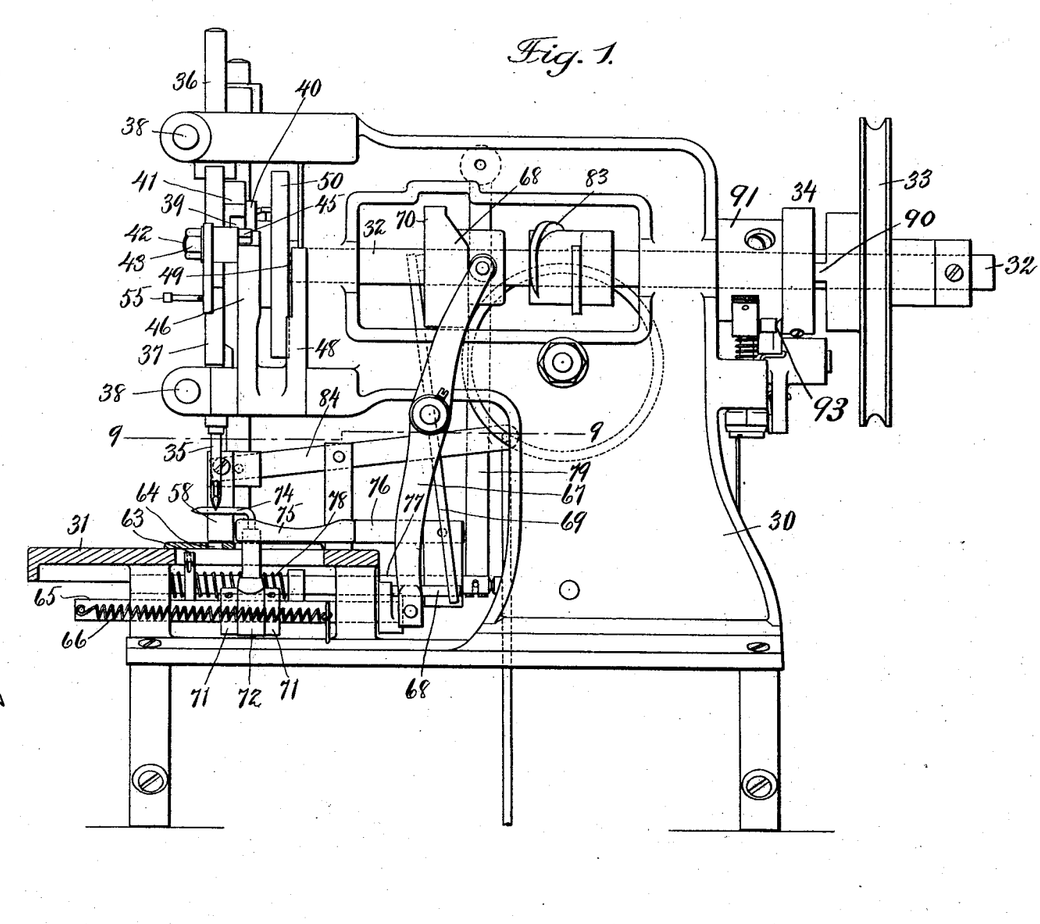
Figure 1 represents a right-hand side elevation of a shoe-tying machine constructed in accordance with my invention.
Figure 8:
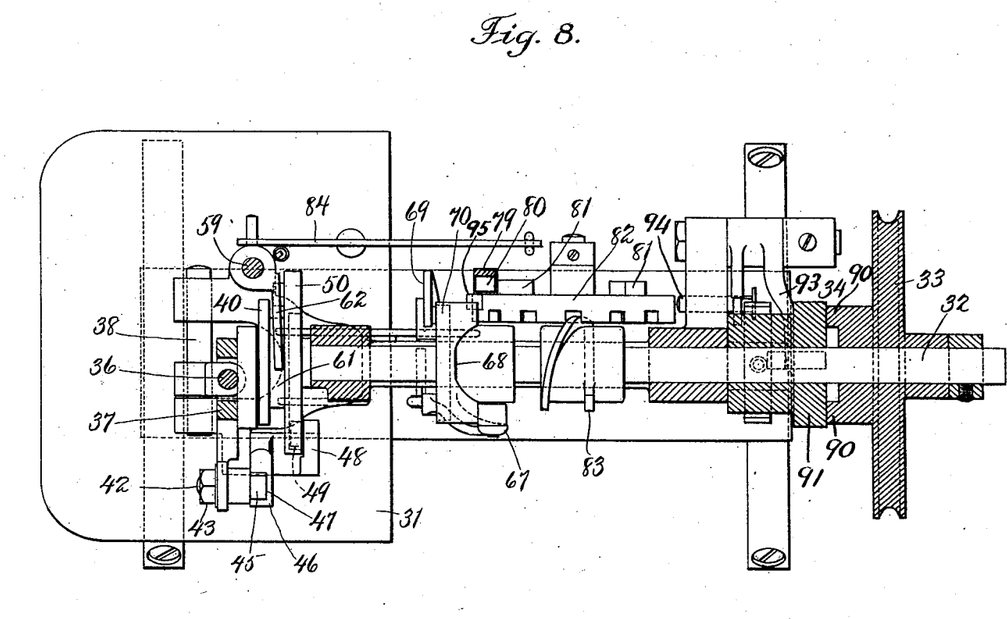
Fig. 8 represents a horizontal section through the main shaft.

In the drawings, 30 is a frame having a work-plate 31 and a horizontal shaft 32 in the upper part of the frame. On said shaft is a belt-pulley 33, and at 34 (see Figs. 1, 2, and 8) is an automatic clutch mechanism adapted to release the shaft and stop the machine after the formation of a predetermined number of stitches. The pulley 33 is loose on shaft 32 and has clutch-lugs 90 90. Fast on the shaft is a collar 91, having a spring-projected clutch-bolt 92. This bolt engages one or the other of the lugs 90 when the machine is performing work, but may be retracted by a spring-elevated wedge 93, normally held out of action by a latch-bolt 94. To stop the machine, one or the other of two cam projections 95 95 on a rotary plate 82, hereinafter referred to, engages latch-bolt 94, causing it to release wedge 93. The specific construction of this mechanism is not important.

35 is the needle, and 36 is the needle-bar, mounted to slide vertically in a frame 37, which itself has horizontal guide-rods 38 38 sliding in fixed bearings for the purpose of imparting the work-feeding movement to the needle. Vertical movement is imparted to the needle by a stud 39, Fig. 1, mounted on a plate 40, attached to shaft 32 and operating in a guide or run way 41, attached to the needle-bar 36. Horizontal movement is imparted to the frame 37 through mechanism including a pin 42, adjustably secured by a nut 43 in a vertical slot 44 on said frame, an oscillating block 45, Fig. 1, on said pin, and a rock-arm 46, having a radial groove 47 receiving said block and secured to a second rock-arm 48, having a stud 49, which operates in the groove of a cam-plate 50, attached to shaft 32. By means of the adjustment provided for pin 42 the horizontal feeding movement of the needle may be varied to suit the spaces found between the eyelets on different shoes.

The needle 35 has a hook 51 and above said hook is hollow-bored to guide a guard-rod 52, having a head-block 53 sliding in the hollow needle-bar 36 and pressed downwardly by a spring 54. When the needle is at any point higher than a position just below the work-plate 31, the lower end of guard 52 resides against the barb of the hook 51 and protects the work or thread from being caught on said barb as the needle rises. When the needle is in its lowest position, receiving the thread from the looper for a new loop, the recess above the hook 51 is opened by a retraction of the guard 52. This is effected by a screw 55, which is attached to the block 53 and projects through a slot 56 in the needle-bar, engaging a shoulder 57 on the frame 37 and holding the guard stationary while the needle descends. The screw 55 projects sufficiently to enable the guard to be manually raised at any time.

Figure 2:
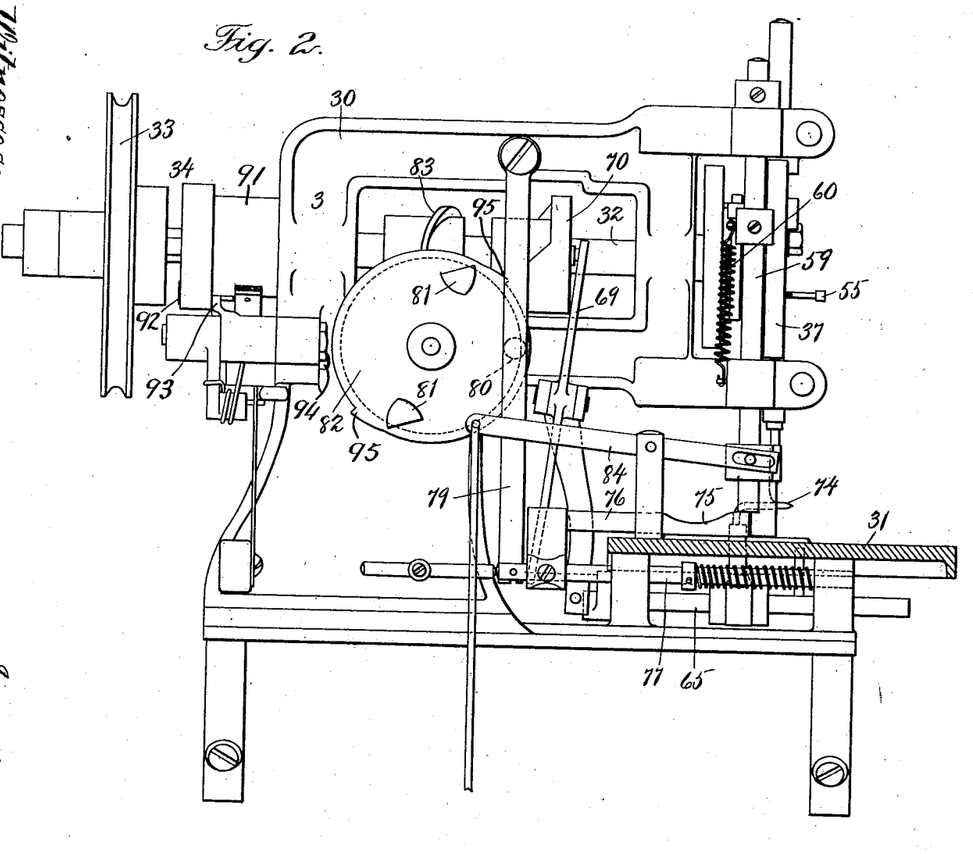
Fig. 2 represents a left-hand side elevation thereof.
Figure 3:
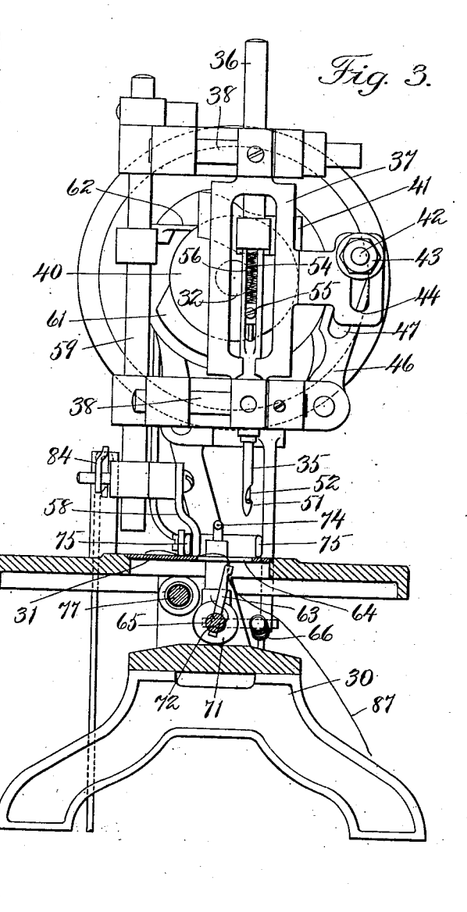
Figs. 3 to 7, inclusive, represent transverse vertical sections at the locality of the needle, showing successive positions of the parts in forming the stitch.

58 is a presser-foot attached to a presser-bar 59, which is lowered by a spring 60, Fig. 2, and positively raised by a cam 61 on shaft 32 engaging a projection 62 on the presser-bar. This presser-foot requires to be raised when the work is fed, so that the stitches, which are formed very loosely, shall not be disturbed; but during the formation of the stitch the presser-foot descends upon the previously-formed stitch, and in addition to holding the work it prevents said stitch from being improperly tightened or pulled by the upward movement of the needle.

For the looper, which coöperates with the needle in forming the stitch, I do not claim novelty in itself nor do I confine myself to any particular form of looper or stitch-forming mechanism.

63 is the tubular looper, which carries a thread leading up from underneath the work-plate and passing through the elongated slot or needle-hole 64 in said plate. The looper is secured to a bar 65, which is slid back by a spring 66 and forward by a rock-lever 67, oscillated by a cam 68 on the shaft 32. The bar 65 is also oscillated by having a crank-pin 68 engaging a pivoted lever 69, which is oscillated transversely of the machine by a path-cam 70 on shaft 32. The effect of this mechanism is to cause the looper 63 to move across the needle 35 when the latter is depressed and lay its thread properly in the hook of said needle in the usual manner of well-known chain-stitch-forming mechanism.

Figure 9:
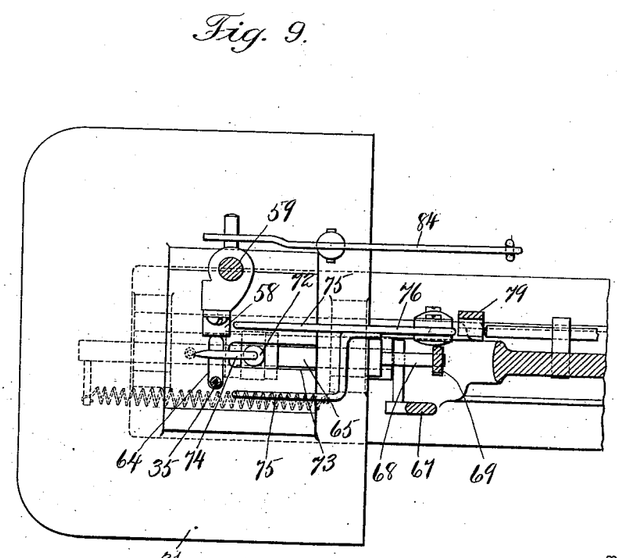
Fig. 9 represents a section on line 9 9 of Fig. 1.
Figures 10, 11, 12:
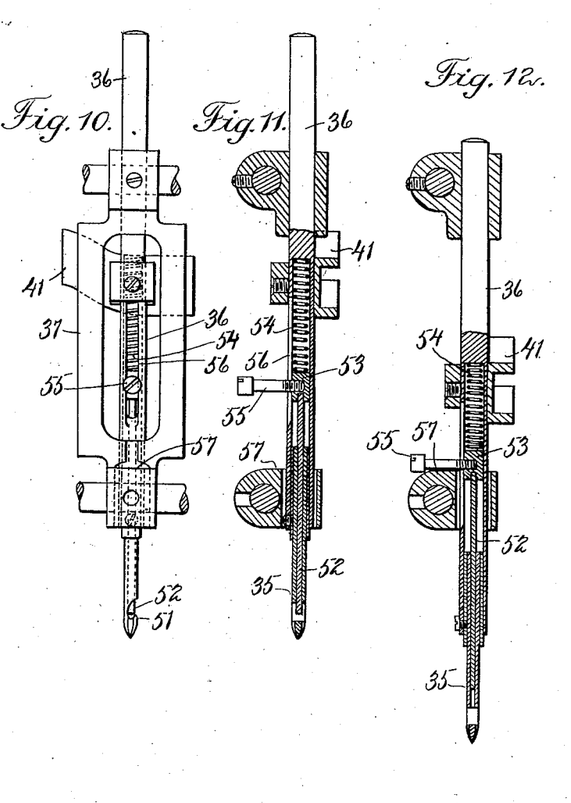
Fig. 10 represents a front elevation of the needle and adjacent parts.
Figs. 11 and 12 represent longitudinal sections thereof, showing the operation of the guard.

The bar 65 carries two collars 71 71, between which is loosely mounted an arm 72, guided in a work-plate slot 73, Fig. 9, and carrying a horizontal pointed pin 74, which reciprocates across the needle-path and acts as a stitch-loosener.

75 75 are two fingers having a shank 76 attached to a horizontally-moving bar 77, said fingers normally acting as a gage to position the edge of the work. The bar 77 is thrown back by a spring 78 and is thrown forward by a pivotal lever 79, having a stud 80 engaged by cam-lugs 81 81 on a rotary plate 82. The latter is rotated by a worm 83 on the shaft 32 engaging teeth on said plate, the arrangement being such that after a predetermined number of cycles of the stitch-forming parts the fingers 75 are operated to throw the work out of the path of the needle and cause the last stitch to be formed outside of the edge of the work.

Figure 6:
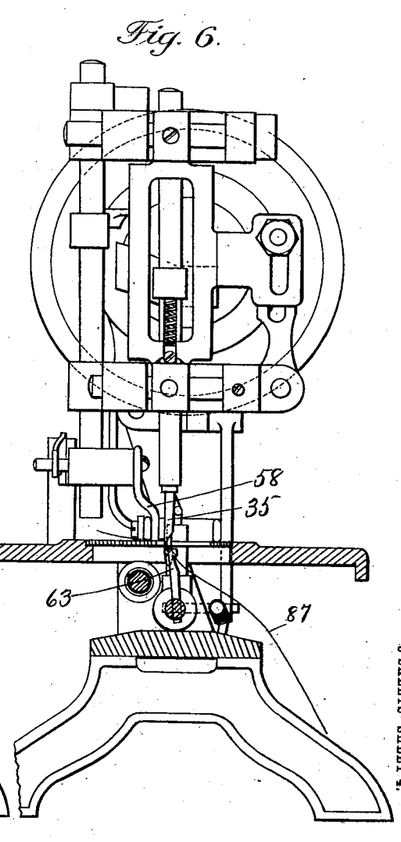
Figure 7:
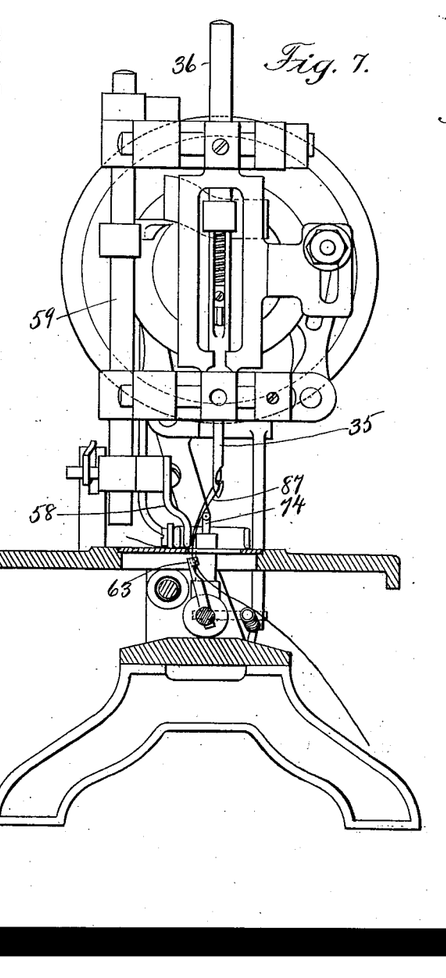
Figure 13:
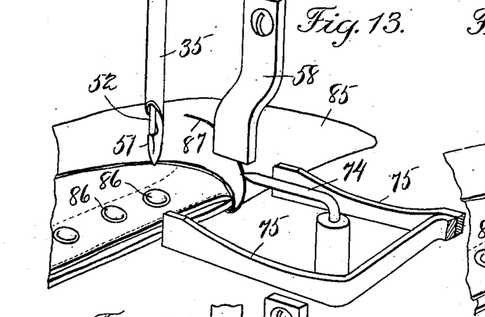
Figure 14:
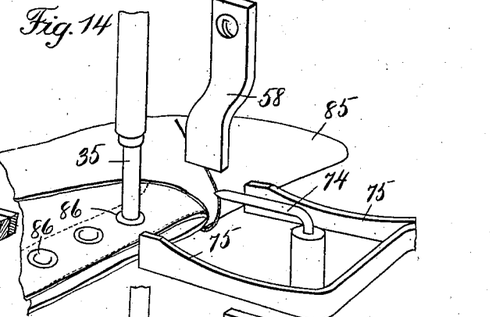
Figures 15, 16, 17, 18:
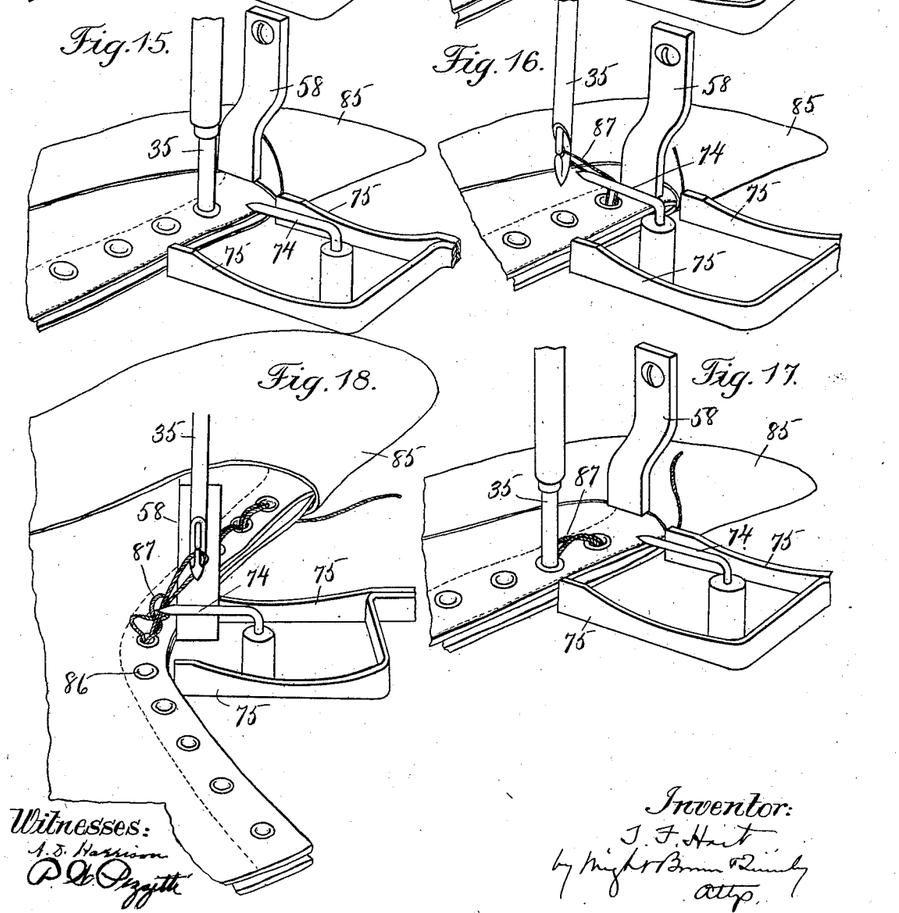

The operation is as follows: The starting position of the machine is with the needle 35 raised, the presser-foot 59 down upon the work-plate, the stitch-loosener 74 thrown across the needle-path and back of the needle, and the work-shifting fingers 75 retracted to one side of the needle-path. These positions are approximately represented in Figs. 1, 2, 3, and 13. To insert the work, the operator raises the presser-foot 58 by means of a lever 84 provided for that purpose and adapted to be connected with a treadle, places the upper 85 against the fingers 75 with the first eyelet 86 in line with the needle 35, the upper being doubled over, so as to bring the eyelets of the two rows in register, and then permits the presser-foot to descend upon the work. The thread end coming through the looper and work-plate may be held under the presser-foot. When the machine is started, the needle descends through the first pair of eyelets, while the presser-foot 58 starts to rise and the stitch-loosener 74 to retract. The guard 52 retreats in the needle as the latter descends to its lowest position, the looper 63 lays the thread 87 in the needle-hook, the needle rises, drawing with it the thread to form the loop, the guard 52 meanwhile descending in the needle to protect the barb of the hook, (the foregoing stages being represented in Figs. 13, 14, and 15,) and the needle rises above the work, carrying with it the loop, as shown in Fig. 16. However, before the needle rises clear of the work, the guard 52 meets the barb of the needle-hook, as seen in Fig. 6, and prevents said barb from catching on the thread or on the under side of the work. While the needle is in its lowermost position and before the loop is laid in its hook, the needle partakes of its rearward lateral feeding movement, whereby by the proper adjustment of parts the work is carried back the distance between two adjacent eyelets, and the upper is then so positioned that the next succeeding eyelet will be in line with the needle when the latter again moves toward the front. This it does when free of the work, carrying the loop with it. While the needle has been rising out of the first eyelet the stitch-loosener 74 has advanced in front of the needle, so that on the forward movement of the needle the loop is carried over said stitch-loosener, as represented in Fig. 16, and enough thread is drawn out to elongate the loop and prevent a tight stitch from being formed. This loose stitch enables the quarters to be opened out or brought into the same plane after being tied by the machine. The needle descends through the second eyelet-hole, the loosener 74 simultaneously retreating till the parts have the positions represented in Fig. 17, the first-formed loop slides up on the needle, the needle takes the second loop, (the needle having previously fed the work rearwardly,) the second loop is drawn through the first, and the chain stitch is formed by a repetition of the foregoing movements.

Figure 4:
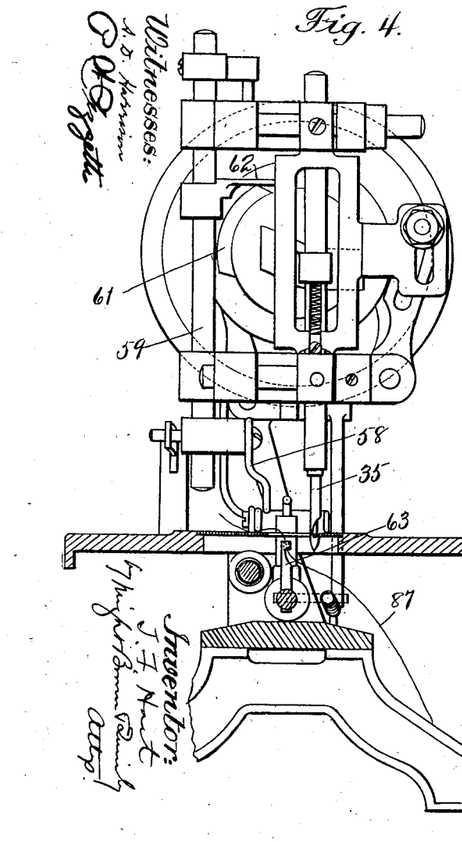
Figure 5:
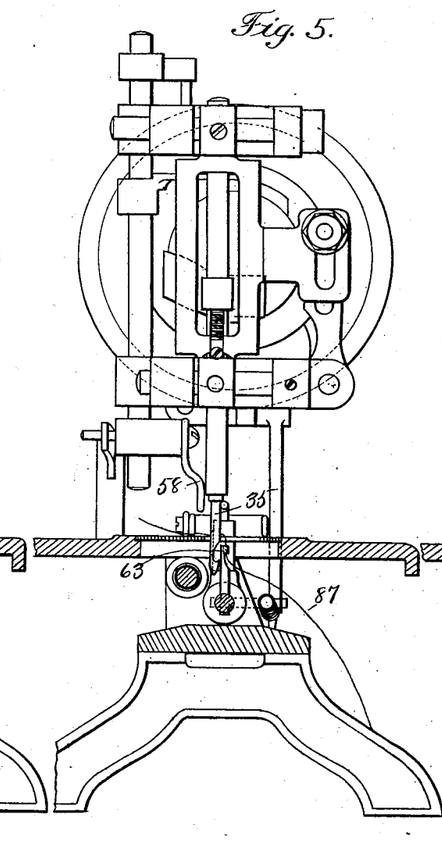

It is important to the successful operation of the machine that the body of the needle above its lower end shall be substantially large enough to fill the eyelets and that the needle shall have a tapering end, as shown in the drawings, in order to slightly shift and aline the work by the action of the needle should the eyelet-holes have a slight irregularity in spacing, as is usually the case. It will be seen, therefore, that apart from the ordinary stitch-forming functions of a needle the element which I call by this name in the present machine has additional functions of alining and feeding the work. As shown in Fig. 4, at the moment that the needle is entering the eyelet the presser-foot 58 is raised from the work, so as to leave the work free to receive such slight centralizing or alining movement as the needle may impart thereto in its descent. Although a needle having a tapered end and enlarged work-alining body back of said end is the simplest means now known to me for performing this eyelet-centralizing function, it will be understood that I do not wholly confine my invention to this means. While the work is stationary in the intervals between its feeding movements, the presser-foot 52 descends thereon, and in addition to holding the same against the upward thrust of the needle it clamps the previously-formed stitch and prevents it from being pulled tight by the movement of the needle.

Figures 19, 20:
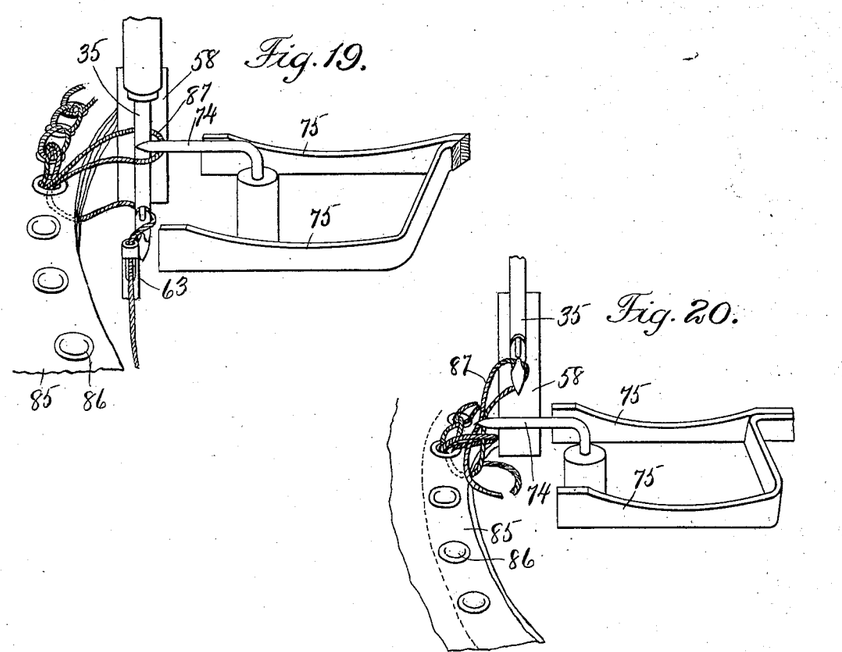
Figure 21:
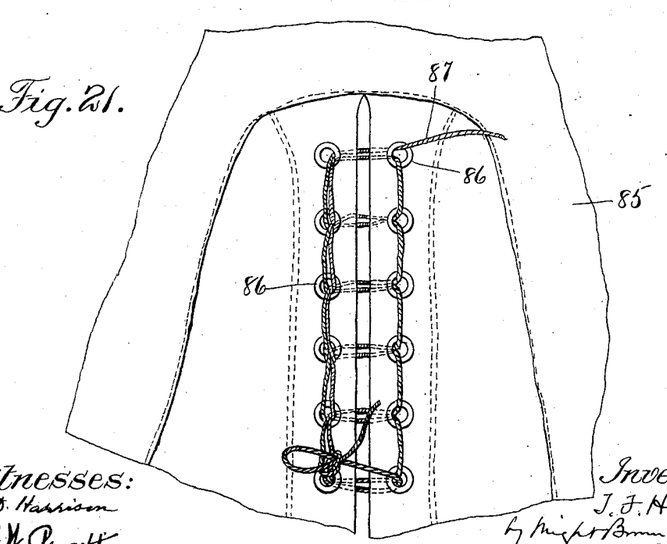
Fig. 21 represents a plan view of the completed work.

After a predetermined number of stitches have been formed, as determined by the construction of the plate 82, the work-shifting fingers 75 advance while the needle is on an upward stroke and force the margin of the work out of line with the needle, as represented in Fig. 18. The next loop, therefore, instead of being carried through an eyelet is formed outside of the margin of the work, as represented in Fig. 19, and being carried up through the previously-formed loop, as shown in Fig. 20, it forms a knot therewith, which when the thread is severed, as represented in said figure, and the upper spread out, as seen in Fig. 21, automatically tightens and prevents untying of the lacing by attempting to pull apart the quarters. Yet when it is necessary to untie the quarters the knot may be untied, and the lacing will then ravel like an ordinary chain stitch.

By the term "lacing mechanism" employed in the claims I include the means whereby the thread or lacing is laced through the eyelets, the feeding devices whereby the said means and the upper are relatively advanced to secure action of said means on the successive pairs of eyelets, and the eyelet-centralizing means.

By means of my invention it becomes practicable to quickly and easily perform an operation which heretofore has been done by hand or other slow method.

I claim—

1. In a machine for lacing together the quarters of shoe-uppers having a series of spaced eyelets upon each edge thereof, lacing mechanism comprising lacing means which operate through the eyelets pair by pair, and mechanism for relatively advancing said means and the upper from pair to pair of the eyelets, said lacing mechanism having additional means for side-shifting the eyelets to aline them with the lacing means.

2. In a machine for lacing together the quarters of shoe-uppers having a series of spaced eyelets upon each edge thereof, lacing mechanism comprising a needle which operates through the eyelets pair by pair, said needle having a tapered end which side-shifts the eyelets to aline them with the needle, and means for imparting a lateral feeding movement to the needle to advance the upper.

3. In a machine for lacing together the quarters of shoe-uppers having a series of spaced eyelets upon each edge thereof, lacing mechanism comprising an eyelet-entering needle and having means for side-shifting the eyelets to aline them with said needle, means for imparting a lateral feeding movement to the needle to advance the upper, and an upper-clamping device which frees the upper during the action of said side-shifting means.

4. In a machine for lacing together the quarters of shoe-uppers having a series of spaced eyelets upon each edge thereof, a non-piercing eyelet-entering needle, means for imparting horizontal movements thereto in opposite directions above and below the work, a lacing-loosener, and means for projecting the same across the plane of movement of the needle when the latter is above the work, whereby the lacing is laid across said loosener, and retracting it when said needle is below the work.

5. In a machine for lacing together the quarters of shoe-uppers having a series of spaced eyelets upon each edge thereof, means for supporting and feeding the upper in a predetermined path, means for forming a continuous succession of chain lacing-stitches with a single thread through the upper, and means for relatively displacing the upper and lacing mechanism transversely of the line of feed on a predetermined stitch whereby that stitch is formed outside of the upper to make a knot.

6. In a machine for lacing together the quarters of shoe-uppers having a series of spaced eyelets upon each edge thereof, means for supporting and feeding the upper in a predetermined path, means for forming a continuous succession of chain lacing-stitches with a single thread through the upper, means for relatively displacing the upper and lacing mechanism transversely of the line of feed on a predetermined stitch whereby that stitch is formed outside of the upper to make a knot, and means for automatically stopping the lacing mechanism at the completion of said outside stitch.

In testimony whereof I have affixed my signature in presence of two witnesses.

THOMAS F. HART.

Witnesses:
R. M. PIERSON,
ADELINE C. RATIGAN.